United States Patent [19]
Kern

[11] 3,720,271
[45] March 13, 1973

[54] BEARING DEVICE AND METHOD FOR USING SAME

[75] Inventor: Loyd R. Kern, Irving, Tex.

[73] Assignee: Atlantic Richfield Company, New York, N.Y)

[22] Filed: March 10, 1971

[21] Appl. No.: 122,904

[52] U.S. Cl..................................175/57, 175/107
[51] Int. Cl..........................E21b 7/00, E21b 3/08
[58] Field of Search......175/57, 107, 104, 65, 24–27; 308/160

[56] References Cited

UNITED STATES PATENTS

| | | | |
|---|---|---|---|
| 2,937,008 | 5/1960 | Whittle | 175/107 X |
| 2,991,837 | 7/1961 | Postlewaite | 175/107 |
| 3,154,355 | 10/1964 | McCafferty | 308/160 |
| 3,159,222 | 12/1964 | Hammer et al. | 175/107 |
| 3,659,662 | 5/1972 | Dicky | 175/107 |

*Primary Examiner*—David H. Brown
*Attorney*—Blucher S. Tharp and Roderick w. MacDonald

[57] ABSTRACT

A self-adjusting bearing device employing multiple bearing means wherein each bearing means being in contact with a piston means which is in movable communication within a chamber. The chamber of each bearing means is in open communication with the chambers of other bearing means by way of conduit means so that movement of one piston means is reflected by movement of the other piston means in the other chambers by way of a liquid in the chambers and conduit means. A method for adjusting a plurality of bearing means so that each carries a predetermined proportion of the total load imposed on the bearing device by employing a movable piston with each bearing means and effecting communication from one movable piston to the rest of the movable pistons in the bearing device so that a movement of one piston is reflected in movement of the remaining pistons thereby distributing the total load among all the bearing means.

15 Claims, 3 Drawing Figures

INVENTOR
LOYD R. KERN

BEARING DEVICE AND METHOD FOR USING SAME

BACKGROUND OF THE INVENTION

Heretofore in the use of a plurality of bearing means in a single bearing device it has been a problem to get each bearing means in the device to share an equal amount of the total load transmitted. In this invention a bearing means is one or more bearings between two opposing bearing races. When two or more bearing means are employed in the same bearing device, unless all of the bearings are sized exactly right and the spacing between adjacent races, and the like are so perfectly machined as to be substantially the same, one bearing means can bear a larger share of the total load on the bearing device than the remaining bearing means thus contributing to a premature bearing failure. Even when all parts of the bearing device are sized and assembled as nearly perfect as possible, premature wear in one bearing means due to lack of quality control, and the like, can still cause a disproportionate amount of the total load to be carried by the remaining bearing means thereby again contributing to premature bearing failure.

The need for a plurality of bearing means in a single bearing device, each carrying an equal part of the total load is prevalent in all types of industry so long as it involves power transmission through a bearing device. The need is particularly acute in the well drilling industry because premature failure of bearings in a drilling tool that is employed in a wellbore creates a substantial amount of financial loss and time loss since all of the drill pipe string, downhole tools, and the like must be removed from the wellbore to replace the tool with the failed bearing. It is even more important in that area of the drilling field known as "slim hole" drilling wherein the borehole is of small diameter, e.g., up to about 6 inches, preferably from about 2 to about 4 inches, and the drill bit is rotated at very high rates of at least about 400 rpm, generally from about 400 to about 3,000 rpm. Conventional drilling methods generally drill 8⅝ to 13⅝ inch diameter boreholes with bit rotation rates of about 100 to 250 rpm.

With the high rotation rates of slim hole drilling in a small diameter borehole, "catastrophic" vibration of the drill string in the wellbore is a constant risk. At rotation rates greater than about 400 rpm the drill string tends to bounce from one side of the borehole to the other at a faster and faster rate until catastrophic vibration sets in and results in failure of the drill string. Failure usually manifests itself by twisting off one section of drill pipe from an adjacent section of drill pipe at their coupling joint.

To avoid rotating the drill string at as high a rate of rotation as is desired for the drill bit, downhole motors have been employed which are connected to the drill bit so that the shaft leading from the downhole motor to the drill bit is the only portion of the drill string, other than the bit, that must rotate at the rate of the bit thereby leaving the drill string which extends to the earth's surface free to rotate at a much slower rate.

This advantage of downhole motors is particularly useful in slim hole drilling with its extremely high bit rotation rates, but is also worthwhile for conventional size bit and rotation rates since in either case substantial amounts of energy loss are avoided because the long drill pipe string does not have to be rotated as fast as the bit.

There is also a need in various industrial applications of being able to distribute a load unevenly to a plurality of bearing means. This is the case when different sizes of bearing means are employed in the same bearing device. In such a situation it is highly desirable to proportion the load on the bearing means so that the larger bearing means bear a predetermined larger portion of the total load than the smaller bearing means.

SUMMARY OF THE INVENTION

According to this invention a self-adjusting bearing device having multiple bearing means is provided wherein there is a shaft means carrying at least two bearing means, each bearing means being composed of first and second race means on opposing sides of at least one bearing, a piston means associated with each bearing means and being movable at least parallel to the direction of the major thrust forces transmitted by the bearing device, a cylinder means adjacent each piston means and a portion of each piston means fitting into the cylinder means, and conduit means openly connecting each cylinder means with the remaining cylinder means in the bearing device.

There is also provided a well drilling device wherein there is employed a downhole motor means, a shaft means connected to said motor means at one end with the other end of the shaft means being adapted to carry a drill bit, the shaft means being supported by a bearing device having multiple bearing means as above described.

There is also provided a method for adjusting a plurality of bearing means so that each carries a predetermined proportion of the total load imposed on all the bearing means present, the method comprising providing first and second pistons for each bearing means, making each piston movable in a cylinder, connecting the interior of each cylinder with the interior of the other cylinders, moving the remaining pistons in response to a movement of one of the pistons, and sizing the surface area of each piston exposed to the interior of its chamber so as to distribute predetermined increments of the total load transmitted by the bearing device among all the bearing means notwithstanding differences in machining, assembling, quality control, and the like between various bearing means.

There is also provided a method for drilling a wellbore by rotating the drill bit with the shaft means of a downhole motor, the shaft means being supported by a plurality of bearing means as described hereinabove.

Accordingly, it is an object of this invention to provide a new and improved bearing device employing multibearing means. It is another object to provide a new and improved downhole drilling means utilizing an adjustable bearing device which will distribute the load transmitted through the bearing device in predetermined increments among all bearing means present and which will maintain this load distribution notwithstanding variations in wear, and the like. It is another object to provide a new and improved apparatus for adjusting a plurality of bearing means so that each bearing means supports an equal amount of the total load transmitted by the plurality of bearing means. It is another object to provide a new and improved method for adjusting a plurality of bearing means so that each carries a predetermined proportion of the total load imposed on all the bearing means. It is another object to provide a new and improved method for drilling a wellbore by employing a downhole motor whose shaft is supported by a plurality of self-adjusting bearing means.

Other aspects, objects, and advantages of this invention will be apparent to those skilled in the art from this disclosure and the appended claims.

DETAILED DESCRIPTION OF THE INVENTION

Figure 1:
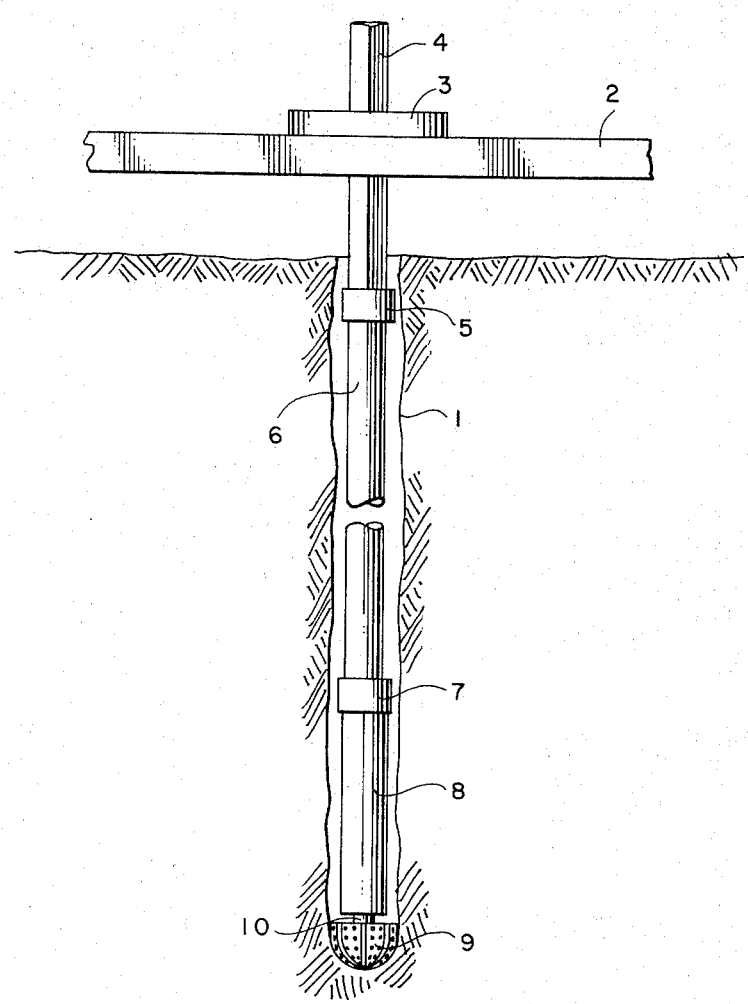
FIG. 1 shows well drilling apparatus in which this invention can be employed.

More specifically, FIG. 1 shows a wellbore 1 in the earth's surface under the working floor 2 of a conventional rotary drilling rig.

Working floor 2 carries a conventional rotary table 3 which is powered by a conventional earth's surface motor means (not shown) and which, when rotated, rotates square kelly 4. Kelly 4 is coupled by means of coupling 5 to drill pipe 6. Drill pipe 6 is coupled by means of coupling 7 to downhole motor means 8 which in turn is fixed to diamond drill bit 9.

In operation, rotary table 3 is rotated by a surface motor means to rotate kelly 4, drill pipe 6, downhole motor 8, and bit 9. Downhole motor 8 is then operated on its own to speed up the rotation of bit 9 to a rotational speed which, if achieved by the drill pipe 6 alone in a slim hole operation, could cause catastrophic vibration of drill pipe 6 in wellbore 1. However, with this invention, drill pipe 6 is rotated at a lower speed than the net rotating speed of bit 9 when downhole motor 8 is in operation.

Accordingly, this invention provides a method of drilling a borehole in the earth by rotating a drilling bit during drilling, the bit being supported from the earth's surface with drill pipe, the rotational speed of the bit being achieved by rotating the bit at a first speed increment using downhole motor means 8 and further rotating the bit an additional second speed increment using a surface motor means to rotate drill pipe 6. The first and second speed increments additively give the desired net rotating speed for the bit during drilling.

The downhole motor means can be located substantially any place along the length of drill pipe 6, but is preferably closer to the bit than the earth's surface when the borehole is deeper than the total length of the bit and downhole motor means. A suitable position for the downhole motor means, but by no means the only position for this invention, is adjacent the bit as shown in the drawing. It should be understood, however, that one or more downhole motor means can be employed and can be spaced upwardly from the bit along the length of the drill pipe as desired.

The net rotating speed desired for the bit in slim hole drilling is at least about 400 rpm and has no upper limit other than that dictated by the capability of the equipment being used, the nature of the earth strata being drilled through, and the like. However, generally, the net rotating speed for the bit will be from about 400 to about 3,000 rpm. The second speed increment, i.e., that provided by the surface motor means such as rotary table 3 of the drawing or a conventional power swivel, or the like, will be a finite rate of rotation up to about 400 rpm. The first speed increment, i.e., that supplied by the downhole motor means, comprises the remainder of the desired net rotating speed of the bit. It is preferable that the second speed increment be at least about 100 rpm but less than the desired net rotating speed of the bit. In this manner the second speed increment is a substantial contributing factor to the net rotating speed and, therefore, the drilling rate of the bit. Thus, for example, the second speed increment can be from about 100 to about 400 rpm but will still be substantially less than the net rotating speed, the difference being made up by operation of one or more downhole motor means.

The second speed increment can be substantially any desired amount less than the net rotating speed so long as catastrophic vibration of the drill pipe is avoided. Generally, the second speed increment will be no more than about one-half the total desired net rotating speed of the bit.

As with the surface motor means, substantially any conventional downhole motor means can be employed. Such motor means are commercially available and well-known in the art. These motor means include downhole electric motors; turbine operated motors such as the "turbo drill" wherein the drilling mud passing downwardly through the interior of the drill pipe runs a turbine in the turbine motor and the turbine turns the drill bit; or motors which are in reality a fluid pump in reverse such as the "dyna-drill." The structure and operation of fluid-pump-in-reverse motors is fully and completely disclosed in U. S. Pat. No. 3,112,801, the disclosure of which is incorporated herein by reference.

Figure 2:
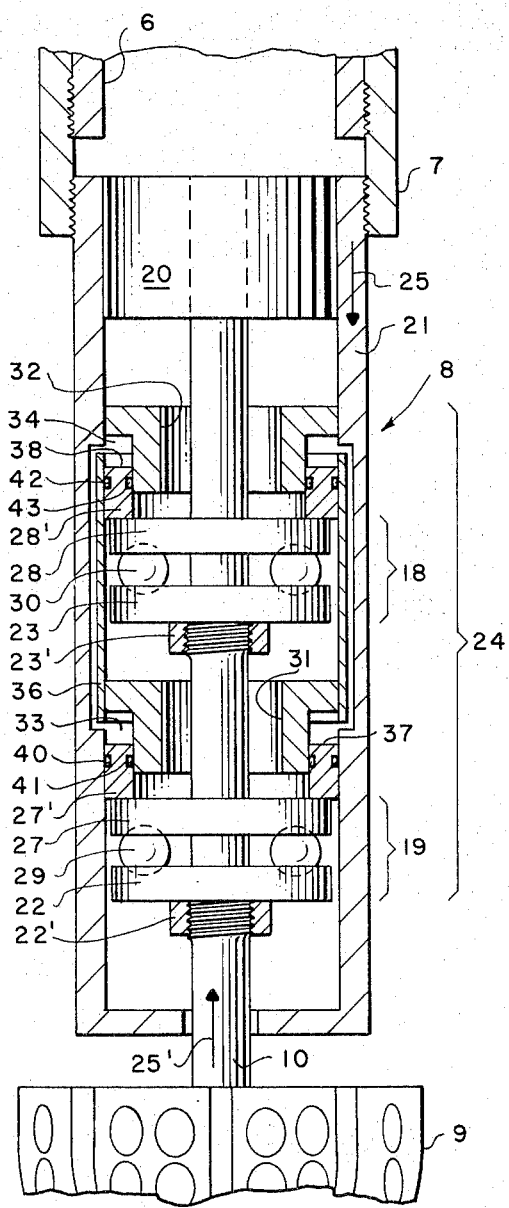
FIG. 2 shows one embodiment within this invention.

FIG. 2 shows a cross-sectional interior of downhole motor 8 and shows this motor to include a motor means 20 which carries a drive shaft means 10 which carries bit 9. Shaft 10 is movable to some degree in motor 20 and parallel to the long axis of shaft 10. Motor 20 is carried in housing 21. Shaft 10 carries first and second bearing means 18 and 19, each having a first race means 22 and 23. Race means 22 and 23 are supported by stops 22' and 23', respectively, and are generally movable parallel to the direction of the major thrust transmitted by the bearing device 24. Stops 22' and 23' are threaded or otherwise fixed to shaft 10. The major thrust forces transmitted by bearing device 24 in the particular apparatus of FIG. 2 is the downward force imposed by the string of drill pipe and which is transmitted as shown by arrow 25 through housing 21 into bearing device 24 and the thrust force 25' by which bit 9 pushes upward on shaft 10. Second race means 27 and 28 are also carried by shaft 10 and are also movable parallel to major thrust forces 25 and 25'.

Second race means 27 and 28 abut piston means 27' and 28' which are, in effect, movable stops so that bearing means 18 and 19 are confined in their movement parallel to the long axis of shaft 10 by their associated pairs of fixed and movable stops 22'-27' and 23'-28'. Annular pistons 27' and 28' each form a piston means in the cylindrical opening of cylinders 31 and 32 thereby providing closed chambers 33 and 34 wherein surface areas 37 and 38 of pistons 27' and 28', respectively, are exposed to the interior of said closed chambers. Closed chambers 33 and 34 are in open communication with one another by way of conduit means 36. When the closed chambers and the conduit means are filled with a substantially non-compressible liquid, movement of one piston in its associated chamber is reflected in movement of the other piston in its associated chamber by way of transmission of the movement of the first piston through the liquid occupying the closed chambers and conduit means.

Thus, if bearings 30 should prematurely wear, shaft 10 and bearing means 18 and 19 would move up thereby substantially increasing the load on bearings 29. Due to the upward movement of bearing means 19, piston 27' will be forced into cylinder 31 which movement will be transferred by way of the liquid in chamber 33 through conduit 36 and the liquid in chamber 34 to piston 28' thereby forcing piston 28' out of cylinder 32 against race 28 to increase the load on the worn bearings 30. In this way the load distribution between bearings 29 and 30 is adjusted to keep the load distribution substantially equal between the two bearing means (one bearing means being the opposed races 22 and 27 with bearings 29 inbetween and the other bearing means being the opposed races 23 and 28 with bearings 30 inbetween).

The bearing device of this invention is, therefore, self-adjusted to account for unequal wear, errors in machining or assembling, and the like, so that both bearing means bear substantially an equal proportion of the total load transmitted by the bearing device. The pistons 27' and 28' should be in substantially liquid tight engagement with the walls of housing 21 and cylinders 31 and 32. This can be provided by O-ring seal means 40 through 43 on the inner and outer surfaces of the piston portion of race means 27 and 28.

Figure 3:
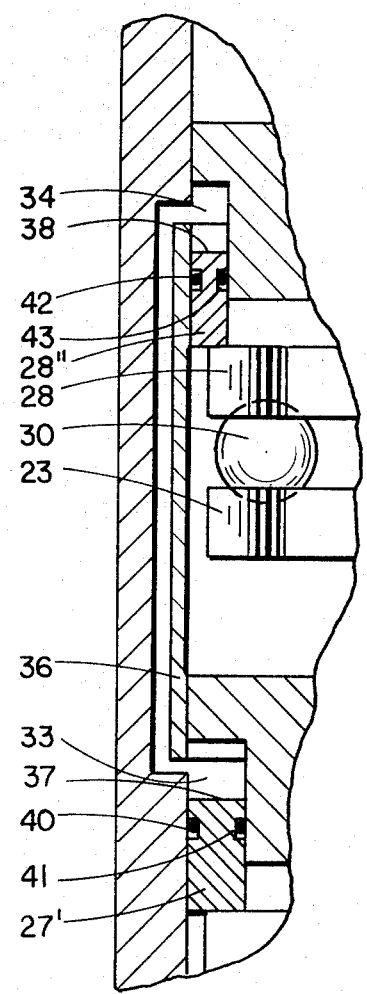
FIG. 3 shows another embodiment within this invention.

The above explanation concerning equal distribution of the total load among all the bearing means is accomplished when the exposed surface areas 37 and 38 of pistons 27' and 28' are substantially equal. Unequal distribution of the total load can also be accomplished with this invention, the unequal distribution being carried out in a predetermined manner, by making surface areas 37 and 38 unequal as shown in FIG. 3. For example, if bearing means 18 were larger than 19, surface area 38 could be made larger than 37 so that bearing means 18 carried a predetermined larger increment of the total load, the magnitude of the larger load increment being directly proportional to the increment of increase of area 38 over 37. This unequal loading of bearing means 18 and 19 would then be maintained automatically by the bearing device 24 notwithstanding premature wear of one of the bearing means, etc., as described above for maintaining equal loading of the bearing means. Conversely, as shown in FIG. 3, piston 28'' can be smaller than piston 27'.

It should be noted that more than two bearing means can be employed in the same manner as described above for bearing means 18 and 19 for equal or unequal distribution of the total load.

It can be seen from FIG. 2 that there is provided within this invention a well drilling device, wherein bit 9 is rotated in the earth utilizing a downhole motor means which employs shaft 10. In the downhole motor shaft 10 is supported by a bearing device 24 comprised of two or more bearing means interconnected with one another by way of conduit means 36 so that the multiple bearing means are self-adjusting according to this invention thereby distributing the load transmitted by the bearing device as desired between the two or more bearing means. It can be seen from FIG. 1 that the downhole motor 8 is supported by a string of drill pipe which extends to the drilling rig at the surface of the earth.

It should be noted that various modifications of the apparatus of FIG. 2 can be made without departing from the scope of this invention. For example, fixed stops 22' and 23' could be mounted on housing 21 and cylinders 31 and 32 mounted on shaft 10 thereby, in effect, moving fixed stops 22' and 23' to housing 21 and switching movable stops 27' and 28' to shaft 10 without altering the advantageous results of this invention of maintaining a predetermined load distribution on a plurality of bearing means.

In the above explanation the operation of the bearing device 24 of FIG. 2, it can be seen that there is provided a method for adjusting a plurality of bearing means so that each carries a predetermined proportion of the total load imposed on all the bearing means. This method includes providing a piston for each bearing means and making each piston movable in an associated cylinder, connecting the interior of each cylinder with the interior of the other cylinders with a liquid, and moving the remaining pistons in response to a movement of one of the pistons to distribute the total load transmitted by the bearing device among all of the bearing means. In this method, when the incremental load on one bearing means increases, this moves the piston associated with that bearing means into its cylinder which causes, by movement of the interconnecting liquid, the remaining pistons to move out of their cylinders toward their respective bearings thereby increasing the load on these bearings and distributing the increased incremental load equally among all of the bearing means. Alternatively, when the incremental load on one bearing means decreases, the piston means associated with that bearing means moves out of its associated cylinder thereby causing movement of the interconnecting liquid so that the remaining pistons move into their associated cylinders away from their respective bearings and thereby distributing the decreased incremental load equally among all the bearing means.

In a method for drilling a wellbore according to this invention, a drill bit is rotated with the shaft of a downhole motor, the shaft being supported by a plurality of bearing means as above described. In this method, the motor, shaft, and bit are also rotated using a surface motor means and the resultant cumulative rotation speed of the bit due to the surface motor rotation combined with the downhole motor rotation is at least about 400 rpm. For example, when the surface motor rotates the bit at a first increment of speed of from about 100 to about 400 rpm, this increment is normally substantially less than the resultant cumulative rotation speed for the bit and the downhole motor means rotates the bit a second increment so that the first and second increments combined give a resultant cumulative rotation speed to the bit of from about 400 to about 3,000 rpm.

EXAMPLE

A 3⅞ inch diameter wellbore is drilled in the earth using apparatus substantially as shown in FIGS. 1 and 2 wherein diamond bit 9 is attached to a downhole subsurface motor substantially as shown in U. S. Pat. No. 3,112,801. This downhole motor is a fluid pump in reverse wherein drilling mud pumped through the drill pipe 6 passes through an annulus between a rotatable eccentric shaft and a spiraled passage way in a rubber lined stator of the downhole motor. In order for the drilling mud to flow through the downhole motor, the eccentric shaft rotates under the pressure of the drilling mud and the drive shaft connected to the eccentric shaft terminates in a conventional bit sub or shaft 10 at the bottom end of the motor. Bit 9 threadably engages the bit sub 10.

Rotary table 3 is operated alone and downhole motor 8 is not operated until a substantial depth of borehole, at least 1,000 feet, is reached. The drill pipe is rotated during this phase of the operation at a speed of 400 rpm.

After reaching 1,000 feet, the length of the drill pipe is such that catastrophic vibration is risked. Therefore, from that depth on rotary table 3 is operated so that the drill pipe rotates at 250 rpm, and downhole motor means 8 is also operated to give an additional speed increment of 750 rpm. This then provides a net rotating speed for bit 9 of 1,000 rpm with no risk of catastrophic vibration of drill pipe 6.

Of course, downhole motor 8 could be operated in combination with the rotary table rotation of drill pipe 6 from the very start of the wellbore, if desired. Alternatively, operation of downhole motor means 8 can be delayed to any point along the length of the final borehole so long as catastrophic vibration of the drill pipe is avoided. The downhole motor means can be used during drilling of at least the last one-third of the borehole.

Reasonable variations and modifications are possible within the scope of this disclosure without departing from the spirit and scope of this invention.

The embodiments of the invention in which an exclusive property or privilege is claimed are defined as follows:

1. In a well drilling device wherein a drill bit is rotated in the earth to drill a wellbore, the improvement comprising a downhole motor means, a shaft means connected to one end of said motor means, the other end of said shaft means being adapted to carry a drill bit, said shaft means being supported by a bearing device having multiple bearing means, said device comprising a shaft means, said bearing means, each bearing means having first and second race means on opposing sides of at least one bearing, each of said bearing means being carried by said shaft means in a spaced apart relation along a portion of the length of said shaft means, a race means from each bearing means being in contact with a piston means which is movable at least parallel to the direction of the major thrust forces transmitted by said bearing device, a cylinder means having at least one opening therein adjacent each of said piston means, a portion of each of said piston means extending into said at least one opening of its adjacent cylinder means in a liquid tight manner to define a closed chamber for each bearing means, each closed chamber being enclosed by the walls of a cylinder means and the exposed surface of its associated piston means, and conduit means openly connecting each closed chamber with the other closed chambers in said device.

2. A device according to claim 1 wherein a drill bit is connected to the other end of said shaft.

3. A device according to claim 1 wherein said cylinder means has a single cylindrical-shaped opening therein, said piston means is cylindrical-shaped and fits within said cylindrical-shaped opening, seal means carried by said piston means to prevent leakage of pressurized liquid from said closed chamber around said piston means.

4. A device according to claim 1 wherein said exposed surface area is substantially the same for each piston means.

5. A device according to claim 1 wherein said exposed surface areas for said piston means are unequal.

6. A device according to claim 1 wherein said bearing means extend transverse to the long axis of said shaft means and said piston means are movable parallel to the long axis of said shaft means.

7. A device according to claim 1 wherein said motor means is supported by a string of drill pipe.

8. In a method for drilling a wellbore by rotating a drill bit with the shaft of a downhole motor, the shaft being supported by a plurality of bearing means, the improvement comprising providing a piston for each bearing means, making said pistons movable in a cylinder, connecting the interior of each cylinder with the interior of the other cylinders with a liquid, moving the remaining pistons in response to a movement of one of said pistons to distribute said total load among all said bearing means.

9. A method according to claim 8 wherein when the incremental load on one bearing means increases, moving the piston associated with that bearing means into its cylinder to thereby cause by the movement of said liquid the remaining pistons to move out of their cylinders towards their respective bearing to distribute the increased incremental load equally among all said bearing means.

10. A method according to claim 8 wherein when the incremental load on one bearing means decreases, moving the piston associated with that bearing means out of its cylinder to thereby cause by the movement of said liquid the remaining pistons to move into their cylinders away from their respective bearing to distribute the decreased incremental load equally among all said bearing means.

11. A method according to claim 8 wherein said load is distributed equally among said bearing means.

12. A method according to claim 8 wherein said load is distributed unequally among said bearing means.

13. A method according to claim 8 wherein said motor, shaft, and bit are rotated using surface motor means and the resultant cumulative rotation speed of said bit due to surface motor rotation combined with the downhole motor rotation is at least about 400 rpm.

14. A method according to claim 13 wherein the borehole drilled has a diameter of up to about 6 inches.

15. A method according to claim 13 wherein said surface motor rotates said bit at a first increment of from about 100 to about 400 rpm, said first increment being substantially less than said resultant cumulative rotation speed, and said downhole motor means rotates said bit a second increment, said first and second increments combined giving a resultant cumulative rotation speed of from about 400 to about 3,000 rpm.

* * * * *